United States Patent [19]

Kanota et al.

[11] Patent Number: 4,984,101
[45] Date of Patent: Jan. 8, 1991

[54] PCM SIGNAL REPRODUCING APPARATUS

[75] Inventors: Keiji Kanota, Kanagawa; Noboru Murabayashi, Tokyo, both of Japan

[73] Assignee: Sony Corporation, Tokyo, Japan

[21] Appl. No.: 248,186

[22] Filed: Sep. 23, 1988

[30] Foreign Application Priority Data

Sep. 28, 1987 [JP] Japan ................... 62-244835

[51] Int. Cl.$^5$ ............................................. G11B 5/03
[52] U.S. Cl. ................................................... 360/65
[58] Field of Search ...................... 368/46, 65, 67

[56] References Cited

U.S. PATENT DOCUMENTS

| 4,371,901 | 2/1983 | Shah | 360/65 |
| 4,500,932 | 2/1985 | Saro et al. | 360/65 |
| 4,564,869 | 1/1986 | Baumeister | 360/65 |
| 4,656,533 | 4/1987 | Sakai et al. | 360/46 |
| 4,805,047 | 2/1989 | Nasu | 360/65 |

Primary Examiner—Vincent P. Canney
Attorney, Agent, or Firm—Alvin Sinderbrand

[57] ABSTRACT

Data reproducing apparatus for reproducing data that is recorded with a selected one of at least two different recording densities such that the played back data may exhibit different frequency characteristics, depending upon the recording density. The played back data is supplied to a selected one of plural equalizer circuits whose respective equalizing characteristics match the frequency characteristics of the played back data, thereby reducing the bit error rate of the played back data, regardless of the particular recording density with which that data had been recorded.

8 Claims, 9 Drawing Sheets

FIG. 5

| | EQL CIR. | EQL | PCM AUDIO | MAGNETIC HEAD | MAGNETIC TAPE | PLAYBACK SPEED |
|---|---|---|---|---|---|---|
| 1 | 42 | 52 A | STD QUAL. | A HEAD | M P | S P |
| 2 | 42 | 52 B | STD QUAL. | A HEAD | M P | L P |
| 3 | 42 | 52 C | STD QUAL. | A HEAD | M E | S P |
| 4 | 42 | 52 D | STD QUAL. | A HEAD | M E | L P |
| 5 | 43 | 52 A | STD QUAL. | B HEAD | M P | S P |
| 6 | 43 | 52 B | STD QUAL. | B HEAD | M P | L P |
| 7 | 43 | 52 C | STD QUAL. | B HEAD | M E | S P |
| 8 | 43 | 52 D | STD QUAL. | B HEAD | M E | L P |
| 9 | 44 | 52 A | HIGH QUAL. | A HEAD | M P | S P |
| 10 | 44 | 52 B | HIGH QUAL. | A HEAD | M P | L P |
| 11 | 44 | 52 C | HIGH QUAL. | A HEAD | M E | S P |
| 12 | 44 | 52 D | HIGH QUAL. | A HEAD | M E | L P |
| 13 | 45 | 52 A | HIGH QUAL. | B HEAD | M P | S P |
| 14 | 45 | 52 B | HIGH QUAL. | B HEAD | M P | L P |
| 15 | 45 | 52 C | HIGH QUAL. | B HEAD | M E | S P |
| 16 | 45 | 52 D | HIGH QUAL. | B HEAD | M E | L P |

FIG.11
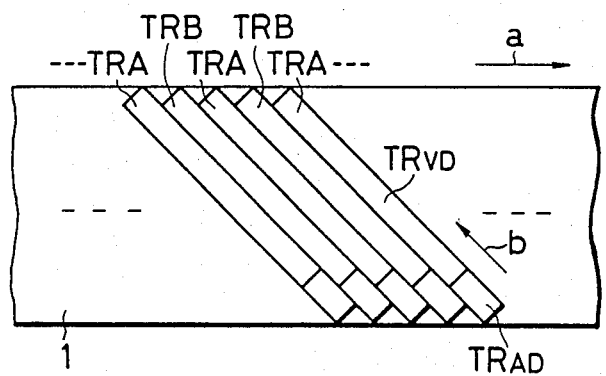
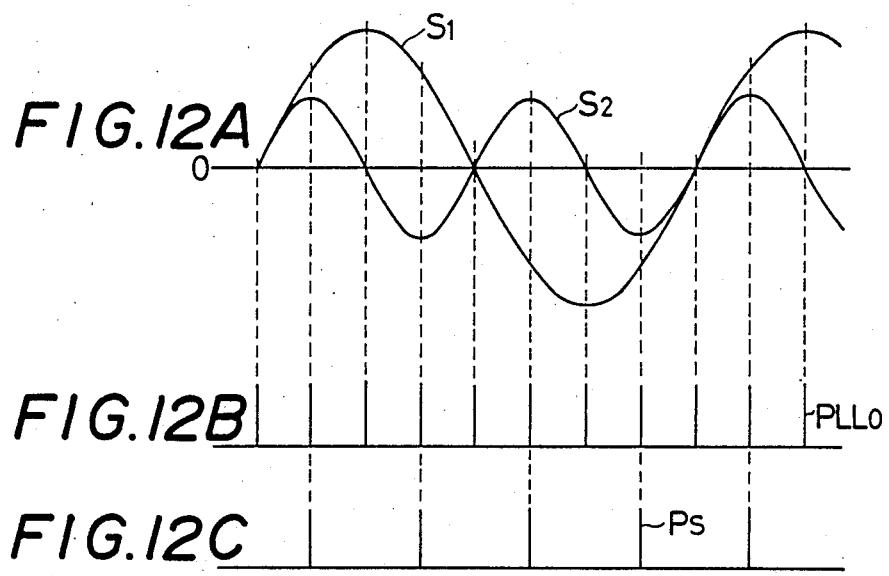

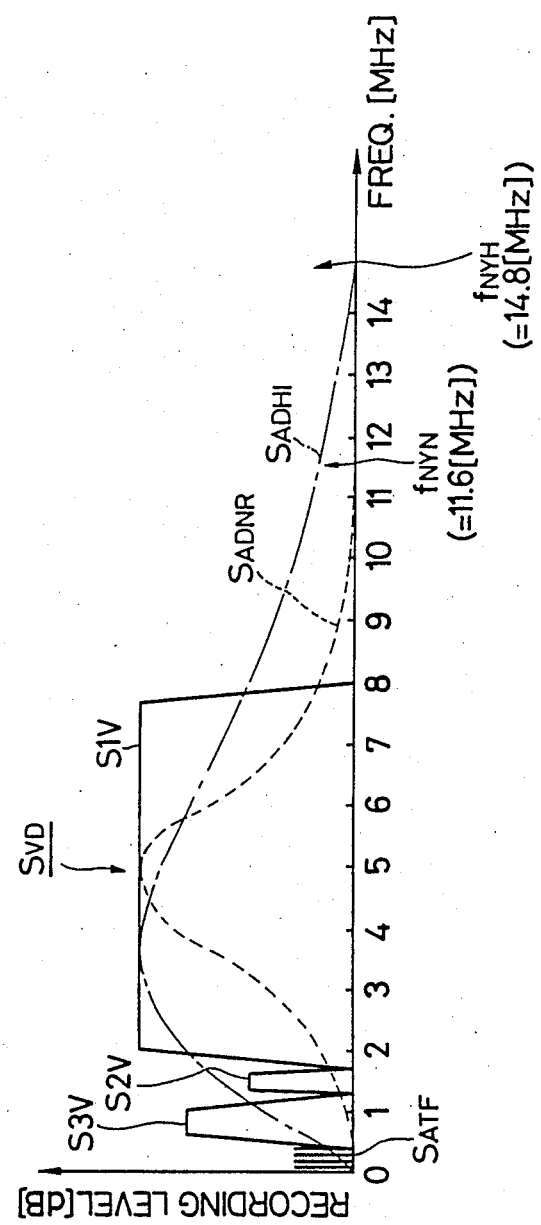

PCM SIGNAL REPRODUCING APPARATUS

BACKGROUND OF THE INVENTION

1. Field of the Invention

This invention relates to data reproducing apparatus and, more particularly, to such apparatus which can be used to play back data having different recording densities, thereby reducing the bit error rate which otherwise may accompany data that had been recorded with a higher (or lower) density.

2. Description of the Prior Art

In one type of data recording/reproducing system, audio information is digitized, as by PCM encoding, and recorded by one or more (preferably, at least two) rotary transducers which helically scan oblique tracks across a moving magnetic tape. Such systems may record and play back only audio signals, such as the so-called R-DAT systems, and others record and play back both audio and video signals. One type of video tape recorder (VTR) in which audio information is PCM encoded is the so-called 8-mm format. In an 8-mm VTR, two (or more) rotary heads scan adjacent tracks across the video tape; and each track includes a video information portion and a separate audio information portion. An example of such an 8-mm format is illustrated in FIG. 11 of the accompanying drawings.

As shown in FIG. 11, alternate tracks TRA and TRB are scanned, and video information is recorded in the video portion $TR_{vd}$ of each track and PCM-encoded audio information is recorded in the audio portion $TR_{ad}$ of the same tracks. Preferably, the PCM-encoded audio signal is time base compressed. The resultant PCM-encoded, compressed signal is recorded by what is known as biphase-mark modulation; and this biphase-mark modulated PCM, compressed audio signal is recorded on the audio portion $TR_{ad}$ of each track TRA, TRB, as described in U.S. Pat. No. 4,551,771, assigned to the assignee of the present invention.

In biphase-mark modulation, the binary signals "1" and "0" are represented by different frequencies. For example, and as shown in FIG. 12A of the accompanying drawings, a signal $S_1$ having a relatively lower frequency $f_1$ (on the order of about 2.9 MHz) and a signal $S_2$ having a relatively higher frequency $f_2$ (on the order of about 5.8 MHz) are recorded to represent a binary "0" and a binary "1", respectively. The relationship between the frequencies $f_1$ and $f_2$ and phases of the signals $S_1$ and $S_2$ is such that the zero crossing points of signal $S_1$ coincide with the zero crossing points of the signal $S_2$. These zero crossing points are used during a playback operation to generate sampling pulses which, in turn, are used to discriminate between signals $S_1$ and $S_2$ and thus demodulate the played back signals into digital "0" and "1" bits.

One technique to generate the aforementioned sampling pulses is to synchronize a phase locked loop with the played back signals $S_1$ and $S_2$. As an example, the phase locked loop may generate clock pulses at a frequency four times the frequency $f_2$ (and, thus, eight times the frequency $f_1$), with the phase locked loop being phase synchronized with the zero crossings of the signals $S_2$ and $S_1$, depending upon which is played back. FIG. 12B of the accompanying drawings illustrates the clock signals generated by the phase locked loop in response to signals $S_1$ and $S_2$. Then, selected ones of these clock signals are extracted, as by a gating circuit, to obtain the sampling pulses $P_s$ shown in FIG. 12C of the accompanying drawings. By comparing the waveforms shown in FIG. 12A with the sampling pulses illustrated in FIG. 12C, it is seen that these sampling pulses occur at 45°, 135°, 225° and 315°, relative to signal $S_1$; and these same sampling pulses occur at 90° and 270° with respect to signal $S_2$.

When the signal $S_1$ is sampled by the sampling pulses $P_s$, it is recognized that a positive level is sampled by two successive sampling pulses and then a negative level is sampled by the next two sampling pulses, followed by a positive level sampled by the next-following two sampling pulses, and so on. However, when the signal $S_2$ is sampled by these very same sampling pulses $P_s$, positive and negative levels are produced in response to successive sampling pulses. Thus, by reason of this sampling, signal $S_1$ can be distinguished from signal $S_2$ and, consequently, "0"s and "1"s can be discriminated. Hence, this sampling technique serves to demodulate a biphase-mark modulated signal. Further description of the reproduction of biphase-mark modulated data is found in copending application Ser. No. 105,830, corresponding to European Published Application No. 264228, both assigned to the assignee of the present invention.

The video information normally recorded on a VTR, and particularly a VTR of the 8-mm format, includes a luminance component that is frequency modulated to a relatively higher frequency band. If biphase-mark modulation is not used, an FM audio signal also is recorded, this audio signal having a frequency band that is less than the FM luminance signal band. In addition, a chrominance signal shifted to a frequency band that is even lower than that of the FM audio signal is recorded, as well as an automatic track follower signal. The frequency spectrum of these signals is illustrated in FIG. 13 of the accompanying drawings, in which a recorded composite television signal $S_{vd}$ is comprised of the FM luminance signal S1V, the FM audio signal S2V, the chrominance component S3V and the automatic track follower signal $S_{ATF}$. All of these signals are superposed and recorded in the alternate tracks shown in FIG. 11.

When recording a PCM audio signal, the same magnetic head that is used to record the composite television signals also records the PCM signal. The frequency spectrum of this PCM signal also is illustrated in FIG. 13 as the PCM audio signal $S_{ADNR}$. Here, the PCM audio signal $S_{ADNR}$ is recorded with biphase mark modulation; and it is seen from FIG. 13 that this signal $S_{ADNR}$ has a peak value at a frequency which substantially coincides with (or at least approximates) the center frequency of the FM luminance signal band S1V. Since the peak value frequency of the PCM audio signal $S_{ADNR}$ is close to the center frequency of the FM luminance band S1V, and since the spectrum of the PCM audio signal $S_{ADNR}$ is substantially within the overall spectrum of the composite television signal $S_{vd}$ (except for higher frequency components having relatively low signal levels), the PCM audio signal is subjected to approximately the same degree of azimuth loss as is exhibited by the video signal $S_{vd}$. As is known, azimuth loss is the phenomenon by which a signal that is recorded by a head having one azimuth angle is substantially attenuated when played back by a head having a different azimuth angle. Azimuth loss is more pronounced at higher frequencies than at lower frequencies. Nevertheless, because the PCM audio signal $S_{ADNR}$ is subjected to azimuth loss, adjacent tracks of both video and audio signals, such as shown in FIG. 11, can be recorded without separating guard bands therebetween. Even without guard bands, azimuth loss minimizes cross-talk in both the video and audio signals which are picked up from an adjacent track. By avoiding guard bands, desirably higher recording densities are attained.

Although the same basic format may be used to record data, and particularly PCM audio information, recording densities can be further improved if higher sampling, or clock, frequencies are used to encode, modulate and record the data. However, it is desired that a particular recording/reproducing device be compatible with various different types of encoding and modulation techniques which improve the recording densities. For example, it is preferred that a given 8-mm VTR be capable of playing back PCM audio data that may be recorded with so-called normal densities or with higher recording densities. For example, the very same data reproducing device should be compatible with PCM-encoded audio information that is recorded by biphase-mark modulation or that is recorded with higher recording densities, for example, by so-called 8-10 modulation. Examples of 8-10 modulation and the advantages attained thereby are described in U.S. Pat. Nos. 4,577,180 and 4,617,552, both assigned to the assignee of the present invention. It is appreciated that, by increasing the recording density of the PCM audio signal, as may be attained by 8-10 encoding, a greater amount of data may be recorded, thereby improving the resolution and, thus, the quality of the audio signal which, ultimately, is played back with higher fidelity.

OBJECTS AND SUMMARY OF THE INVENTION

Therefore, it is an object of the present invention to provide data reproducing apparatus which is compatible with a standard recorded digital signal as well as with a high quality recorded digital signal.

Another object of this invention is to provide data reproducing apparatus which accurately recovers standard and high quality PCM audio signals without an increase in bit error rate.

A further object of this invention is to provide data reproducing apparatus which recovers PCM audio signals that may be recorded with a relatively lower recording density as well as PCM audio signals that may be recorded with a relatively higher recording density, without loss of information or fidelity, and without an increase in bit error rate.

An additional object of this invention is to provide data reproducing apparatus having equalizer circuitry which is matched to various combinations of recording densities, record medium type, and record medium transport speeds such that a particular equalizer can be selected having equalizing characteristics matched to the data being reproduced from a particular record medium at a selected transport speed.

Various other objects, advantages and features of the present invention will become readily apparent from the ensuing detailed description, and the novel features will be particularly pointed out in the appended claims.

In accordance with this invention, data reproducing apparatus is provided for reproducing data that is recorded on a record medium with a selected one of at least two different recording densities, whereby first or second playback data having first or second frequency characteristics, respectively, is picked up. As an example, the first frequency characteristic may be attributed to a relatively lower recording density and the second frequency characteristic may be attributed to a relatively higher recording density. One of two equalizer sections having respective equalizing characteristics matched to the first and second frequency characteristics of the played back data is selected to process that data as a function of whether the played back data has the first or the second frequency characteristics.

As a feature of this invention, biphase-mark modulation is used to record data with a relatively lower recording density, and N-M encoding (such as 8-10 encoding) is used to record the data with relatively higher recording density.

As one aspect of this invention, the record medium is a magnetic medium which may exhibit one of plural different recording characteristics, such as a coated magnetic tape or an evaporated magnetic tape. The equalizer sections include equalizer circuits which are matched not only to the different frequency characteristics of the played back data but also to the particular recording characteristics of the magnetic medium. Thus, a particular equalizer is selected, depending upon both the type of record medium and recording density which were used during recording.

As yet another aspect of this invention, the record medium may be transported at any one of different transport speeds, such as a normal play speed and a long play speed. The equalizer sections further include equalizer circuits which are matched not only to the frequency characteristics of the playback data, but also to the frequency response attributed to the particular transport speed of the record medium. Hence, the particular equalizer which is selected is a function of the recording density and tape transport speed used during recording and play back.

As an additional aspect of this invention, two (or more) rotary heads are used to record and reproduce data from the record medium; and each set of equalizers is additionally matched to the playback characteristics of a respective one of these heads. Hence, the selection of an equalizer is determined by the recording density and head used to play back the data.

Desirably, several equalizers are provided, each having equalizing characteristics to match the combination of recording density, type of record medium, transport speed and head used to record/reproduce the data. The particular equalizer which is selected to receive and process the played back data thus is a function of recording density, medium type, medium transport speed and particular head used to record and reproduce the data. As a result, the bit error rate of the equalizer output is reduced, even though different recording densities, media and transport spreads may be used.

BRIEF DESCRIPTION OF THE DRAWINGS

The following detailed description, given by way of example, will best be understood in conjunction with the accompanying drawings in which:

FIG. 5 is a table which is useful in understanding the present invention;

Figure 3:
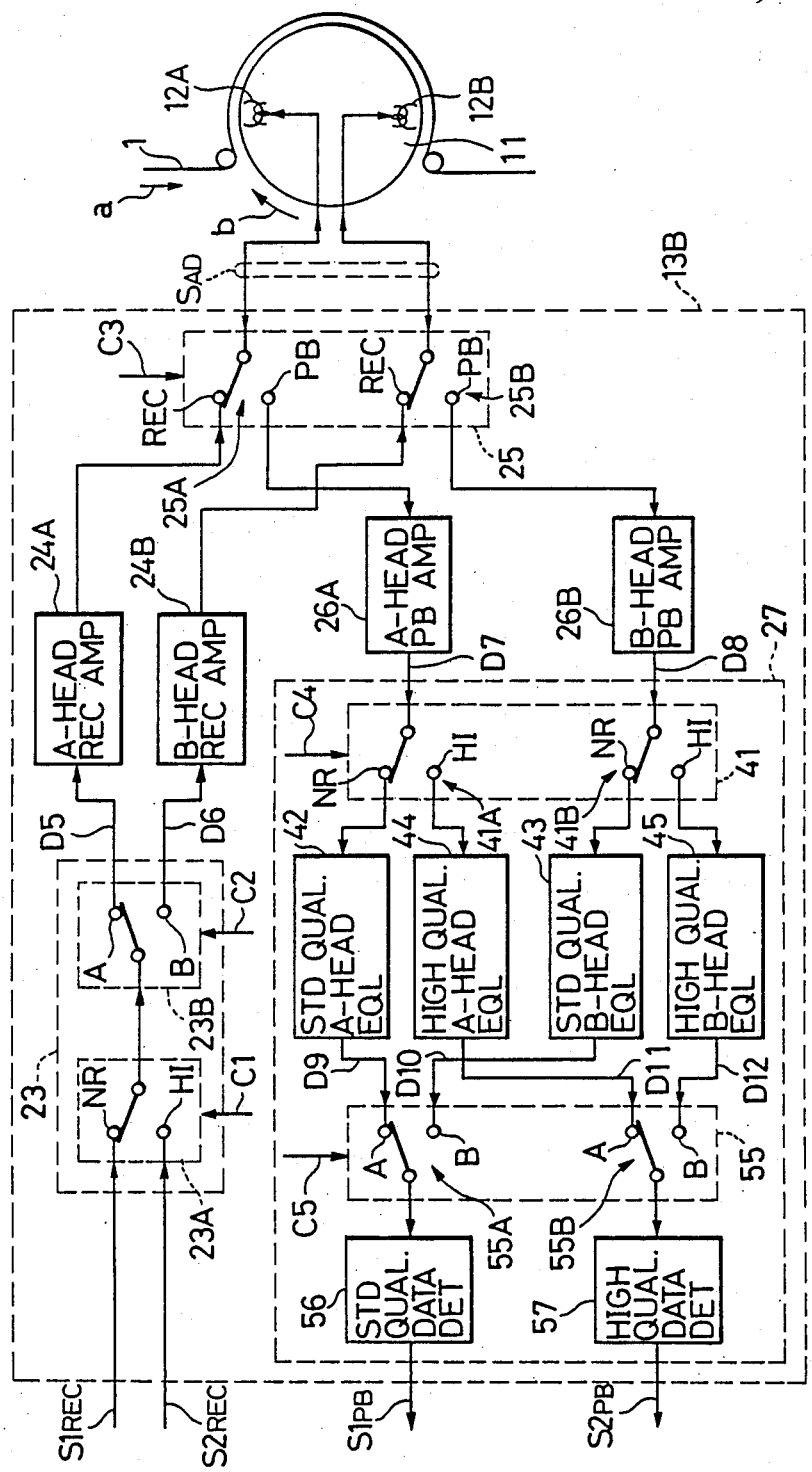
FIG. 3 is a block diagram showing the record/playback circuit of FIG. 1 in greater detail.
Figure 7:
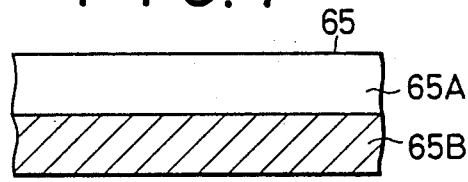
Figure 8:
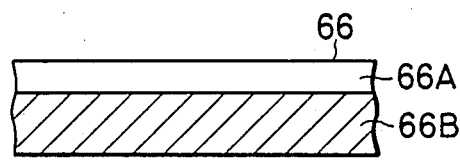
Figure 9:
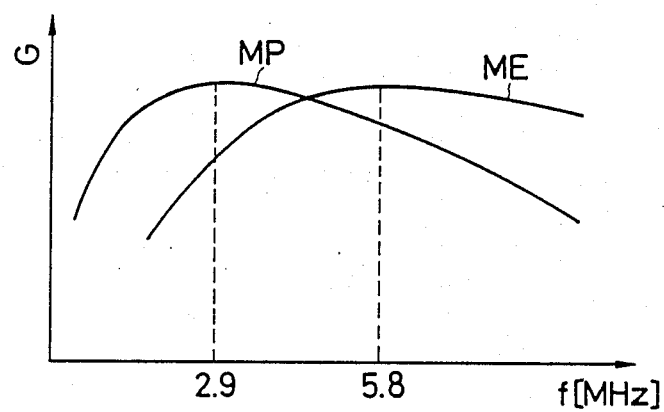
Figure 10:
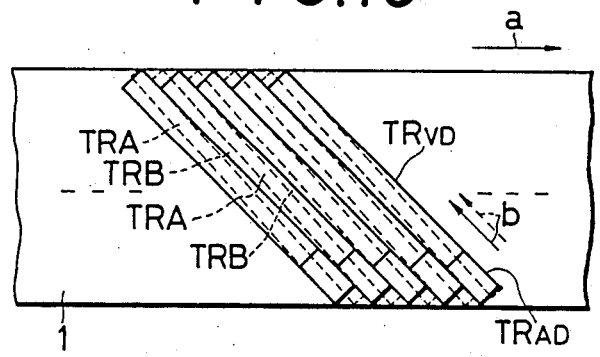

FIG. is a block diagram of one embodiment of the data detector shown in FIG. 3;

FIGS. 7 and 8 are sectional views of magnetic media with which the present invention can be used;

FIG. 9 is a graphical representation of the differing characteristics of different types of magnetic media;

FIG. 10 is a representative diagram of track patterns traced on a magnetic tape that can be moved at different transport speeds;

FIG. 11 is a representative diagram of typical track patterns recorded on a magnetic tape, as discussed above;

FIGS. 12A–12C are waveform and timing diagrams which are helpful in understanding biphase-mark modulation, and have been discussed above; and FIG. 13 is a graphical representation of the frequency spectrum of recorded signals, and has been discussed above.

DETAILED DESCRIPTION OF A PREFERRED EMBODIMENT

Figure 1:
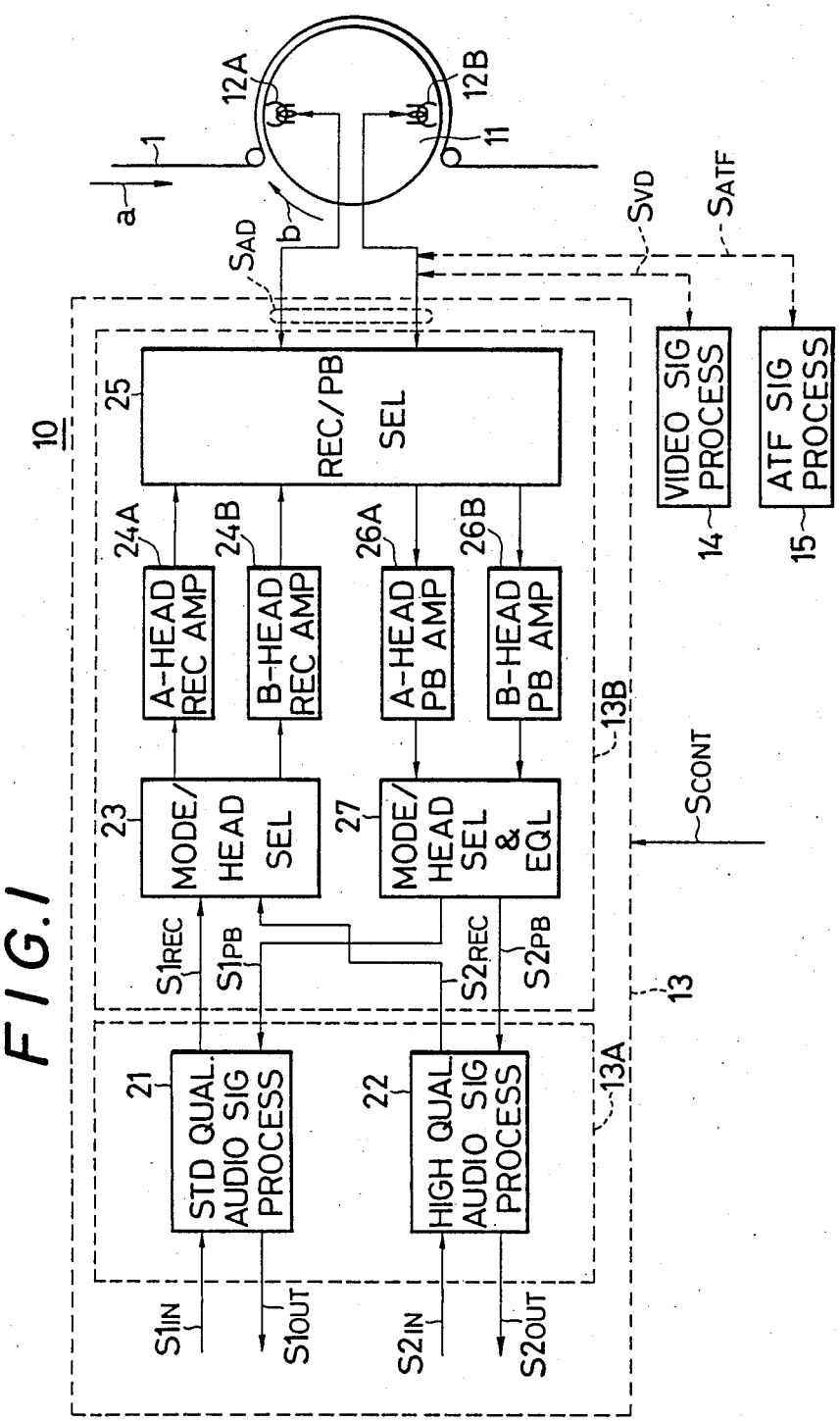
FIG. 1 is a block diagram of data reproducing apparatus in which the present invention finds ready application.

Referring now to the drawings, wherein like reference numerals are used throughout, FIG. 1 is a block diagram of data recording/reproducing apparatus with which the present invention finds ready application. The apparatus shown in FIG. 1 can be used to record and play back video and audio signals in 8 mm VTR format. Recording/reproducing apparatus 10 includes a rotary drum 11 about which magnetic tape 1 is helically wrapped and transported, the tape being scanned by a pair of rotary heads 12A and 12B which record and reproduce oblique tracks across the tape, as shown in FIG. 11. Heads 12A and 12B are coupled to an audio signal processing section 13, a video signal processing section 14, and an automatic track follower processing section 15. Audio signals $S_{AD}$ are supplied to heads 12A and 12B from audio signal processing section 13 during a recording operation; and audio signals $S_{AD}$ are picked up from tape 1 and supplied to section 13 during a signal reproducing operation. Similarly, video signals $S_{VD}$ are communicated between video signal processing section 14 and the rotary heads; and an automatic track following signal $S_{ATF}$ is communicated between the heads and ATF processing section 15. The present invention is directed more particularly to audio signal processing section 13, as will now be described in greater detail.

Audio signal processing section 13 is adapted to record audio signals that have been PCM encoded and modulated in accordance with what is described herein as a standard, or normal, quality modulation, such as biphase-mark modulation, or a high quality modulation having higher recording densities and representing audio information with higher resolution, such as 8-10 modulation. In this regard, audio signal processing section 13 is comprised of a data processing unit 13A and a record/playback unit 13B. The data processing unit is described in greater detail in FIG. 2 and includes a standard, or normal, quality audio signal processing circuit 21 and a high quality audio signal processing circuit 22. One or the other of circuits 21 and 22 is selected, as in response to a control signal $S_{CONT}$ supplied from a system controller (not shown). During a recording operation, the selected signal processing circuit responds to an input audio signal $S1_{IN}$ or $S2_{IN}$ to produce a signal suitable for recording, such as signal $S1_{REC}$ or signal $S2_{REC}$, respectively. During a signal reproducing operation, signals which are played back from magnetic tape 1 by heads 12A and 12B are supplied to one or the other of signal processing circuits 21 and 22, depending upon whether the played back signals had been recorded as standard quality or high quality signals, and audio output signals $S1_{OUT}$ or $S2_{OUT}$ are derived from these played back signals by the respective signal processing circuits.

Record/playback unit 13B includes a mode/head selector circuit 23 which is operative during a recording operation to receive one or the other of the signals $S1_{REC}$ and $S2_{REC}$, depending upon which of signal processing circuits 21 and 22 has been selected. Mode/head selector circuit 23 is adapted to supply recording signals for heads 12A and 12B, respectively, and circuit 23 is coupled to record amplifiers 24A and 24B which amplify the record signals to be supplied to the respective heads. Amplifiers 24A and 24B are coupled to heads 12A and 12B by a record/playback selector 25, which may be constructed as a switching circuit.

Playback amplifiers 26A and 26B are coupled to heads 12A and 12B, respectively, by record/playback selector 25 to receive the signals which are played back from magnetic tape 1 by these heads. Playback amplifiers 26A and 26B are coupled to a mode/head selector and equalizer circuit 27 which is described in greater detail below. Circuit 27 is adapted to combine the signals reproduced by heads 12A and 12B into a single data stream, to equalize those signals and to supply the equalized signals to signal processing circuit 21 or signal processing circuit 22, depending upon whether the signals had been recorded as standard or high quality audio signals. Standard quality reproduced signals are supplied to signal processing circuit 21 as signals $S1_{PB}$, and high quality reproduced signals are supplied to signal processing circuit 22 as signals $S2_{PB}$. Audio signals $S1_{OUT}$ are recovered from the standard quality signals $S1_{PB}$ by signal processing circuit 21 and supplied further circuitry. Likewise, audio signals $S2_{OUT}$ are recovered from the high quality reproduced signals $S2_{PB}$ by signal processing circuit 22 and supplied to further circuitry.

Briefly, in operation, if audio signals are to be recorded and reproduced with standard quality (for example, if biphase-mark modulation is used), standard quality audio signal processing circuit 21 is selected for the recording and the reproducing operations. An input audio signal $S1_{IN}$ is processed and supplied as PCM-encoded, biphase-mark modulated signals $S1_{REC}$ to record amplifiers 24A and 24B by mode/head selector circuit 23. When head 12A scans tape 1, the output of record amplifier 24A is supplied to that head by record/playback selector 25. Likewise, when head 12B scans tape 1, the record signal $S1_{REC}$ is supplied thereto from record amplifier 24B. Thus, the tracks shown in FIG. 11 are recorded.

During a playback operation, record/playback selector 25 couples playback amplifiers 26A and 26B to heads 12A and 12B, and decouples record amplifiers 24A and 24B. When head 12A scans tape 1 to reproduce signals therefrom, these signals are supplied to playback amplifier 26A and then to mode/head selector and equalizer circuit 27. Likewise, when head 12B scans tape 1, the signals reproduced from the tape are supplied by this head to playback amplifier 26B and then to the mode/head selector and equalizer circuit.

It has been assumed that the signals reproduced from tape 1 had been recorded as standard quality signals.

Accordingly, the equalizer circuits included in mode-/head selector and equalizer circuit 27 are matched to the frequency characteristics of such standard quality signals; and the equalized, reproduced signals $S1_{PB}$ alternately recovered from heads 12A and 12B are supplied to standard quality audio signal processing circuit 21 for demodulation. As a result, output signals $S1_{OUT}$ are produced.

If high quality recording and reproducing modes are selected, the aforedescribed operation is repeated, except that high quality audio signal processor circuit 22 is selected to encode and modulate input signals $S2_{IN}$ and to decode and demodulate reproduced signals $S2_{PB}$ to supply output audio signals $S2_{OUT}$. Furthermore, the equalizer circuitry included in mode/head selector and equalizer circuit 27 is selected (as will be described) with equalizing characteristics matched to the high quality frequency characteristics of the signals which now are played back from tape 1.

As will also be described, tape 1 may be transported at a standard record/playback speed or at a slow, or long play, speed. Depending upon the transport speed of the tape, the frequency characteristics of the reproduced signals may vary. Mode/head selector and equalizer circuit 27 includes additional equalizer circuits having equalizing characteristics matched to the particular transport speed of tape 1.

As will be described further below, the magnetic medium upon which the signals are recorded and reproduced may be of the so-called coated type or of the evaporated type. Here too, the recording characteristics of the magnetic medium influence the frequency characteristics of the signals reproduced therefrom. Mode/head selector and equalizer circuit 27 is provided with additional equalizer circuits having equalizing characteristics matched to the recording characteristics of the particular tape which is used.

Still further, heads 12A and 12B desirably exhibit different azimuth angles such that the phenomenon of azimuth loss can be used to eliminate the need for guard bands between adjacent tracks. Consequently, the playback characteristics of heads 12A and 12B are expected to differ from each other. Mode/head selector and equalizer circuit 27 additionally includes equalizer circuits having equalizing characteristics matched to the playback characteristics of the respective heads.

As a result, the reproduced signals are equalized as a function of the recording densities used to record those signals (i.e. whether the signals were recorded as standard or high quality signals), the transport speed of magnetic medium 1, the type of magnetic medium used and the particular recording characteristics of the respective heads. The bit error rate of the data thus supplied by mode/head selector and equalizer circuit 27, that is, the bit error rate of signals $S1_{PB}$ and $S2_{PB}$, is reduced.

Figure 2:
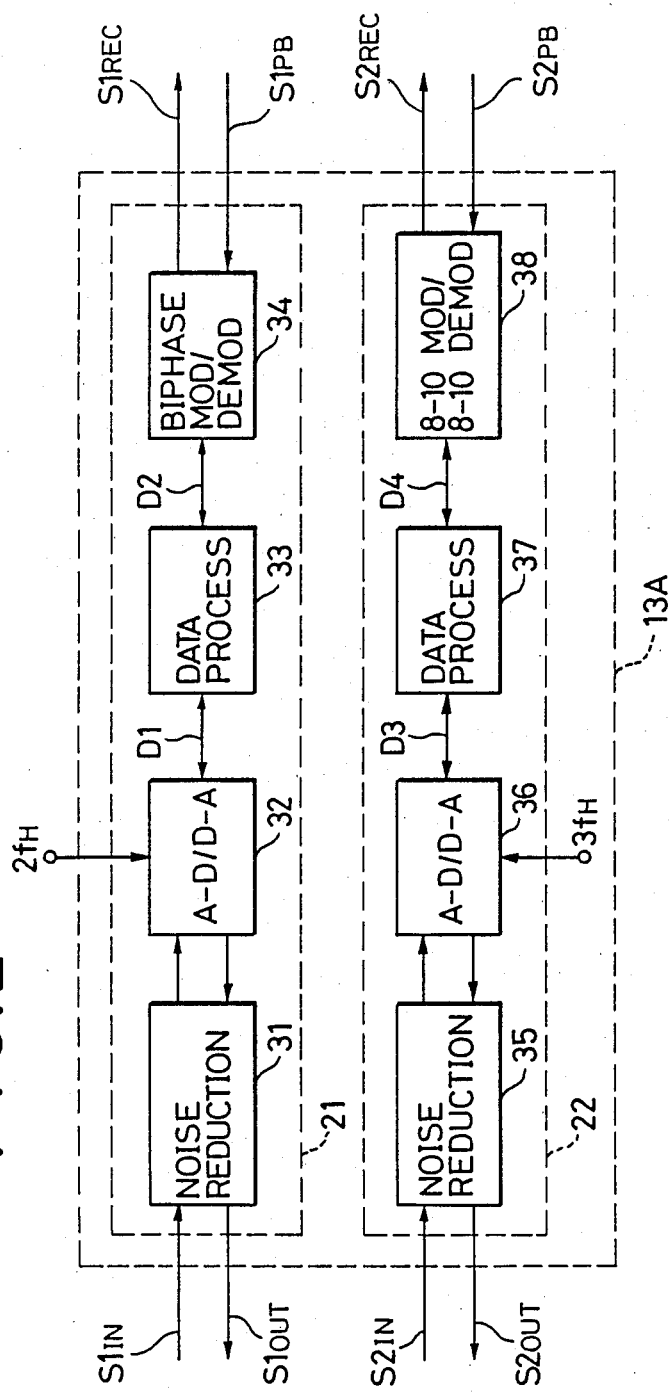
FIG. 2 is a block diagram of one embodiment of audio signal processors shown in FIG. 1.

Turning now to FIG. 2, a block diagram of one embodiment of audio signal processing circuits 21 and 22 included in data processing unit 13A is illustrated. Standard quality audio signal processing circuit 21 is comprised of a noise reduction circuit 31, an A-D/D-A converter 32, a data processing circuit 33 and a biphase-mark modulator/demodulator 34. Noise reduction circuit 31 is adapted to receive input audio signal $S1_{IN}$ and is coupled to A-D/D-A converter 32. This converter functions during a recording operation as an analog-to-digital (A-D) converter and is supplied with a sampling signal of a standard sampling frequency $2f_H$, wherein $f_H$ is a frequency substantially equal to the usual video horizontal frequency. Thus, in the example described herein, the sampling signal supplied to converter 32 has a frequency of $2f_H=31.5$ KHz. It will be appreciated that, during a reproducing operation, the digital-to-analog converter included in A-D/D-A converter 32 is selected for operation and responds to the sampling signal of frequency $2f_H$ to convert a digital signal D1 supplied thereto to analog form. Thus, A-D/D-A converter 32 may be thought of as having two separate converters, one being an A-D converter and the other being a D-A converter, the former being selected for a recording operation and the latter being selected for a reproducing operation.

A-D/D-A converter 32 is adapted, during a recording operation, to convert the analog signal supplied thereto to a 10-bit PCM signal D1. Data processing circuit 33 is coupled to A-D/D-A converter 32 and includes a frame memory for storing PCM data D1. In addition, the data processing circuit is adapted to add a cyclic redundancy check code (CRCC signal) to the stored data, this CRCC signal functioning as an error correcting code which is useful during subsequent data reproduction to recover a lost or destroyed data bit. The data processing circuit is additionally adapted to compress the 10-bit PCM signal to an 8-bit signal. Such 10-8 bit conversion reduces quantizing noise when the digital signal is a result of non-linear quantization either from a non-linear encoder or from a non-linear compressor.

Data processing circuit 33 also includes a reconverter operable during a playback mode to reconvert a reproduced 8-bit signal to its original 10-bit format. The data processing circuit additionally includes an error corrector which uses the CRCC error code for correcting data-bit errors. Furthermore, if a reproduced data word is lost or destroyed, the data processing circuit includes means for interpolating recovered data so as to provide an acceptable replacement for the lost information. 10-8bit conversion/reconversion, CRCC correction and data interpolation are techniques known to those of ordinary skill in the art and form no part of the present invention per se. In the interest of brevity, further description thereof is not provided.

Data processing circuit 33 is coupled to biphase modulator/demodulator 34 which is adapted to modulate the processed data signals D2 supplied from the data processing circuit with the aforementioned frequencies $f_1$ and $f_2$ to apply an output signal $S1_{REC}$ suitable for recording. The biphase modulated output signal $S1_{REC}$ has been described above in connection with FIG. 12.

It is appreciated that biphase modulator/demodulator 34 includes respective modulating and demodulating circuitry, the modulating circuitry being operative during a data recording operation and the demodulating circuitry being operative during a data reproduction operation. As shown in FIG. 2, reproduced signals $S1_{PB}$ are supplied to biphase modulator/demodulator 34, as by aforedescribed mode/head selector and equalizer circuit 27 (FIG. 1) for biphase demodulation.

High quality audio signal processing circuit 22 is seen to be quite similar in construction to processing circuit 21, and is comprised of noise reduction circuit 35, A-D/D-A converter 36, data processing circuit 37 and modulator/demodulator 38. These respective circuits included in high quality audio signal processing circuit 22 are similar to the aforedescribed circuits included in standard quality audio signal processing circuit 21. However, it will be seen that the sampling signal supplied to A-D/D-A converter 36 included in the high quality audio signal processing circuit exhibits a higher frequency—shown here to be a sampling frequency $3f_H$—for the purpose of digitizing the input audio signal $S2_{IN}$ at a higher data rate, thereby improving the resolution and, thus, quality of the PCM audio signal D3 produced by converter 36. As a numerical example, the sampling frequency $3f_H$ which is used to digitize the audio signal $S2_{IN}$ is on the order of about 48 KHz.

The A-D converter included in converter 36 is adapted to produce a 16-bit PCM signal in response to each sample of the input audio signal $S2_{IN}$. Similarly, the D-A converter included in converter 36 is adapted to convert a 16-bit PCM signal D3 derived during a data reproducing operation, and produce an analog signal in response thereto.

Data processing circuit 37 includes, in addition to the frame memory discussed above with respect to data processing circuit 33, a circuit for adding a cross interleave reed-Solomon code (CIRC error code) to the PCM data D3 supplied thereto during a recording operation. This data processing circuit also includes error correcting means for correcting erroneous or destroyed bits in reproduced data signals D4 by means of the CIRC error code. Additionally, the data processing circuit utilizes the error-corrected data to recover a lost data word by means of interpolation. CIRC error code generation and utilization, and data interpolation for reducing errors in recovered digital signals are techniques know to those of ordinary skill in the art and form no part of the present invention per se.

Data processing circuit 37 is coupled to modulator/demodulator 38 which is adapted to provide high quality modulation of the digital data D4 supplied thereto during a recording operation. Likewise, during a reproducing operation, modulator/demodulator 38 is adapted to provide high quality demodulation of the reproduced data signals $S2_{PB}$ and recover the digital data D4. In the preferred embodiment described herein, 8-10 modulation is used and, thus, modulator/demodulator 38 is comprised of an 8-10 modulator used during a recording operation and an 8-10 demodulator used during a reproducing operation.

The 8-10 modulator functions to convert an 8-bit signal into a 10-bit signal and further provides NRZI (non-return to zero inverted) conversion. By converting an 8-bit signal into a 10-bit signal, the number of consecutive "1" s and "0" s that may be present in the 10-bit signal is substantially reduced, thereby minimizing a DC component that may be present when the converted signal is magnetically recorded. Hence, DC level shifts that might otherwise influence the recorded signal and, thus, might otherwise result in data detection errors (e.g. a "1" might be erroneously detected as a "0") are minimized. 8-10 modulation is a technique suggested for use in digital audio tape recorders, such as R-DAT recorders, and is described in U.S. Pat. Nos. 4,577,180 and 4,617,552, both assigned to the assignee of the present invention.

For high quality audio signal processing, the A-D converter included in converter 36 generates a 16-bit data word in response to each sample of the input audio signal $S2_{IN}$. In one embodiment, data processing circuit 37 functions to segment each 16-bit word into 8-bit sub-blocks. Hence, 2 8-bit sub-blocks constitute each digitized audio signal sample. In an alternative embodiment, this segmenting of the 16-bit PCM signal into 8-bit sub-blocks is carried out by the 8-10 modulator included in modulator/demodulator 38.

In either embodiment, the 8-10 modulator functions to convert each 8-bit sub-block into a 10-bit block. Hence, only $2^8$ 10-bit blocks may be selected from a maximum of $2^{10}$ 10-bit blocks to represent all of the possible 8-bit sub-blocks into which the 16-bit PCM signal has been segmented. That is, of the total possible 1,024 10-bit blocks, only 256 are selected to represent all of the possible 8-bit sub-blocks. It is appreciated that this permits the selection of 10-bit blocks having a minimal number of successive "1"s and "0"s.

Briefly, in operation, let it be assumed that standard quality recording of the audio signal is desired. Accordingly, audio input signal $S1_{IN}$ is subjected to noise reduction and then is converted to a 10-bit PCM signal by the A-D converter included in A-D/D-A converter 32. This 10-bit PCM signal D1 is converted to an 8-bit signal D2 by data processing circuit 33; and, additionally, a CRCC error code is added. Then, 8-bit signal D2 is biphase modulated and supplied as a recording signal $S1_{REC}$ to mode/head selector 23 (FIG. 1). During a reproducing operation, a standard quality digital audio signal is supplied to modulator/demodulator 34 by mode/head selector and equalizer circuit 27 (FIG. 1), and this signal $S1_{PB}$ is demodulated to reproduce 8-bit data signals D2. These data signals are supplied to data processing circuit 33 whereat CRCC error detection and correction is carried out and, moreover, data interpolation is utilized to recover lost or destroyed data words. The recovered, error-corrected 8-bit signals are reconverted to 10-bit PCM signals D1, and these PCM signals are converted to analog form by the D-A converter included in converter 32. After being subjected to noise reduction, these analog signals are supplied as output audio signals $S1_{OUT}$.

Now, let it be assumed that input audio signals $S2_{IN}$ are to be recorded with high quality. These audio signals are noise reduced and supplied to the A-D converter included in converter 36 whereat the audio signal is sampled at the higher sampling rate $3f_H$ (approximately 48 KHz) to produce 16-bit PCM data. The 16-bit data D3 has a CIRC error code added thereto by data processing circuit 37 and is supplied to modulator/demodulator 38. Each 16-bit PCM word is segmented into 2 8-bit sub-blocks and each sub-block is converted into a 10-bit block. The 10-bit block is supplied as a recording signal $S2_{REC}$ to mode/head selector 23 for recording on the magnetic medium.

During a signal reproducing operation, 10-bit blocks $S2_{PB}$ are supplied to the demodulator included in 8-10 modulator/demodulator 38 by mode/head selector and equalizer circuit 27 (FIG. 1). Each 10-bit block is reconverted to an 8-bit sub-block; and the 8-bit sub-blocks are reconverted to the original 16-bit PCM signals D3. In one embodiment data processing circuit 37 operates on each 8-bit sub-block to error correct and data interpolate the 8-bit data. In another embodiment, data processing circuit 37 is supplied with the reconverted 16-bit PCM signals, and operates on each 16-bit word to error correct and data interpolate those digital signals. In either embodiment, the 16-bit PCM signals D3 are converted to analog form by the D-A converter included in converter 36. The resultant analog audio signals are noise reduced and supplied as audio output signals $S2_{OUT}$.

Record/playback unit 13B of FIG. 1 is illustrated in greater detail in FIG. 3. As mentioned above, the record/playback unit operates during a recording operation to receive either the standard quality audio recording signals $S1_{REC}$ or the high quality audio recording signals $S2_{REC}$ from data processing unit 13A (just described with reference to FIG. 2) for recording on magnetic medium 1. Likewise, during a playback operation, record/playback unit 13B receives either the standard quality or high quality signals reproduced from the magnetic medium, equalizes those reproduced signals, and supplies the recovered, equalized standard quality digital audio signals $S1_{PB}$ or high quality digital audio signals $S2_{PB}$ to the data processing unit.

As illustrated in FIG. 3, record/playback unit 13B includes a recording section and a playback section. The recording section includes mode/head selector 23 and recording amplifiers 24A and 24B. Mode/head selector 23 is comprised of a mode switch 23A and a head switch 23B. Both of these switches, as well as the remaining switches illustrated in FIG. 3, are shown as simplified electromechanical switches; but it will be appreciated that these switches preferably are constructed as semiconductor devices known to those of ordinary skill in the art.

Mode switch 23A includes input terminals adapted to received digitized audio signals $S1_{REC}$ and $S2_{REC}$ for standard or high quality recording, respectively. A control signal C1 connects mode switch 23A to normal terminal NR to receive the digitized audio signal for standard quality recording or to terminal HI to receive the digitized audio signal for high quality recording. Head switch 23B is coupled to the output of mode switch 23A and includes output terminals A and B for supplying the digitized audio signal applied to the head switch either to head 12A or to head 12B, respectively. A control signal C2 controls the terminals A and B to which head switch 23B is connected. Recording amplifier 24A, described above, is coupled to the A terminal of switch 23B to receive digitized audio signals D5, to amplify those signals and to apply same to head 12A. Similarly, record amplifier 24B is coupled to terminal B of switch 23B to receive digitized audio signals D6, to amplify those signals and to supply same to head 12B. Record/playback selector 25 is shown as a switching circuit having switches 25A and 25B coupled to heads 12A and 12B, respectively. Each of switches 25A and 25B includes a record terminal REC and a playback terminal PB. Under the control of a control signal C3, record/playback selector 25 connects either the record terminals REC of switches 25A and 25B, or the playback terminals PB of these switches, to heads 12A and 12B. It is appreciated that, during a recording mode, record terminals REC of switches 25A and 25B are connected to heads 12A and 12B, respectively.

Mode/head selector and equalizer circuit 27 of FIG. 1 is shown in greater detail in FIG. 3. As illustrated, this circuit includes an input switch 41, equalizer circuits 42–45, an output switch 55 and data detectors 56 and 57. Switch 41 includes a pair of inputs coupled to the playback terminals PB of switches 25A and 25B via playback amplifiers 26A and 26B, respectively. It is appreciated that each playback amplifier is adapted to amplify the reproduced digital audio signals $S_{AD}$ derived from a respective one of heads 12A and 12B. In particular, playback amplifier 26A is adapted to amplify the signals reproduced by head 12A and, similarly, playback amplifier 26B is adapted to amplify the signals reproduced by head 12B. These amplified, reproduced signals D7 and D8 are coupled to switches 41A and 41B, respectively, of switch 41.

Switch 41A includes a pair of terminals identified as terminals NR and HI. Terminal NR is adapted to receive played back signals D7 that had been recorded with standard quality. Similarly, terminal HI is adapted to receive played back signals D7 that had been recorded with high quality. Likewise, switch 41B includes terminals NR and HI for receiving played back signals D8 that had been recorded with standard or high quality, respectively. A control signal C4 connects either terminals NR or terminals HI to playback amplifiers 26A and 26B.

Equalizer circuits 42–45 are of circuit constructions known to those of ordinary skill in the art and exhibit equalizing characteristics adapted to match the frequency characteristics of the signals supplied thereto. The equalizing circuits may be thought of as two sets of equalizers, one set having equalizing characteristics matched to the frequency characteristics of the reproduced signals that had been recorded with standard quality, such as those recorded with biphase modulation, and the other set having equalizing characteristics matched to the frequency characteristics of those signals that had been recorded with high quality, such as those signals which had been recorded with 8-10 modulation. Since the recorded signals are reproduced by respective heads 12A and 12B, each set of equalizing circuits further exhibits equalizing characteristics matched to a respective one of these heads. Thus, equalizing circuits 42 and 43 exhibit equalizing characteristics matched to the frequency characteristics of the standard quality playback signals, with equalizer circuit 42 being additionally matched to the playback characteristics of head 12A and with equalizer circuit 43 being additionally matched to the playback characteristics of head 12B. Likewise, equalizer circuits 44 and 45 exhibit equalizing characteristics matched to the frequency characteristics of the high quality playback signals, with equalizer circuit 44 being additionally matched to the playback characteristics of head 12A and with equalizer circuit 45 being additionally matched to the playback characteristics of head 12B.

An output switch 55 is coupled to equalizer circuits 42–45 to recover a single data stream of either the standard quality equalized reproduced signals or the high quality equalized reproduced signals. Switch 55 is comprised of a standard quality switch 55A and a high quality switch 55B, each including terminals A and B. As shown, terminal A of switch 55A is coupled to standard quality equalizer circuit 42 and terminal B thereof is coupled to standard quality equalizer circuit 43. Likewise, terminal A of switch 55B is coupled to high quality equalizer circuit 44 and terminal B is coupled to high quality equalizer circuit 45. A control signal C5 determines whether switches 55A and 55B are coupled to terminals A or to terminals B. The outputs of switches 55A and 55B are connected to standard and high quality data detectors 56 and 57, respectively.

Let it be assumed that a recording operation is carried out. Accordingly, control signal C3 connects switches 25A and 25B of record/playback selector 25 to record terminals REC. If a standard quality audio signal is to be recorded, control signal C1 connects mode switch 23A to terminal NR for receiving the digitized standard quality audio signal $S1_{REC}$.

Now, when head 12A rotates into a recording position with respect to magnetic tape 1, control signal C2 connects head switch 23B to terminal A. Consequently, the standard quality digital audio signal $S1_{REC}$ follow the following path: To terminal NR of mode switch 23A, to terminal A of head switch 23B, to recording amplifier 24A to record terminal REC of record/playback selector 25 to head 12A. When head 12B rotates to a recording position, control signal C2 changes over head switch 23B from terminal A to terminal B. Consequently the standard quality digital audio signal $S1_{REC}$ now follows the following path: To terminal NR of mode switch 23A, to terminal B of head switch 23B to recording amplifier 24B, to record terminal REC of switch 25B included in record/playback selector 25, to head B. It is appreciated that control signal C2 controls the connection of head switch 23B such that the output of recording amplifiers 24A and 24B are selectively connected to heads 12A and 12B when those heads are in the proper recording position.

If high quality recording is to be carried out, the aforedescribed operation is repeated, except that control signal C1 now connects mode switch 23A to terminal HI. The high quality digital audio signal $S2_{REC}$ thus is coupled by mode switch 23A to recording amplifiers 24A and B as heads 12A and 12B respectively rotate to recording positions.

For a playback operation, control signal C3 connects switches 25A and 25B of record/playback selector 25 to respective terminals PB. Thus, audio signals $S_{AD}$ reproduced by heads 12A and 12B from, for example, audio portions $TR_{AD}$ of tracks TRA and TRB (FIG. 11) are supplied to playback amplifiers 26A and 26B, respectively. Let it be assumed that audio signals of standard quality are to be reproduced. Accordingly, control signal C4 connects switches 41A and 41B of mode selector 41 to terminals NR. As a result, digital audio signals reproduced by head 12A are coupled via switch 41A to equalizer circuit 42; and digital audio signals reproduced by head 12B are coupled by switch 41B to equalizer circuit 41B. The equalizing characteristics of equalizer circuit 42 are matched to the frequency characteristics of the standard quality playback signals and also to the playback characteristics of head 12A. Thus, standard quality playback signals D7 are equalized and supplied as equalized signals D9 to terminal A of switch 55A included in head selector 55. Likewise, the equalizing characteristics of equalizer circuit 43 are matched to the frequency characteristics of the standard quality playback signals, and also to the playback characteristics of head 12B. Thus, standard quality audio signals D8 are equalized and supplied as signals D10 to terminal B.

When signals are reproduced by head 12A, control signal C5 connects switch 55A to terminal A; and standard quality data detector 56 thus receives the standard quality equalized signals reproduced by this head. When head 12B rotates into position to reproduce digital audio signals from magnetic tape 1, control signal C5 connects switch 55A to terminal B. Thus, standard quality data detector 56 now receives the standard quality equalized signals reproduced by head 12B. It is seen that switch 55A is changed over to supply a substantially continuous stream of equalized signals D9 and D10, as played back by heads 12A and 12B, respectively, to data detector 56. The data detector applies the played back equalized digital audio signals $S1_{PB}$ to modulator/demodulator 34 of FIG. 2.

If high quality digital audio signals are played back, the foregoing operation is repeated, except that control signal C4 now connects switches 41A and 41B of mode selector 41 to terminals HI. Now, the high quality digital audio signals reproduced by head 12A are supplied to equalizer circuit 44 whose equalizing characteristics are matched to the frequency characteristics of the high quality playback signal and also to the playback characteristics of head 12A. Likewise, the digital audio signals which are reproduced by head 12B are supplied to equalizer circuit 45 whose equalizing characteristics are matched to the frequency characteristics of the high quality playback signal and also to the playback characteristics of this head.

Switch 55B of head selector 55 alternately selects the outputs from equalizer circuits 44 and 45 to form a substantially continuous data stream of equalized playback signals. These signals are coupled to high quality data detector 57 from which the high quality equalized playback signals $S2_{PB}$ are applied to 8-10 modulator/demodulator 38 of FIG. 2.

Preferably, different types of magnetic tape 1 may be used for the recording and reproduction of signals. As an example, the magnetic tape may comprise a metal powder coating, known as MP tape, or the tape may comprise a metal evaporate layer of magnetic material, known as an ME tape. The record/playback characteristics of MP tape differ from those of ME tape. It is desirable, therefore, to equalize the signals reproduced from MP and ME type tapes; and in this regard, the equalizing characteristics of equalizer circuits 42–45 should be matched to either MP tape or ME tape.

Similarly, it is desirable to record and reproduce signals on tape 1 using different tape transport speeds. For example, the tape may be transported at a normal speed or at a slower, long playing speed. Depending upon the tape transport speed which is used, particularly during signal reproduction, the frequency characteristics of the reproduced signals may vary. Hence, the respective equalizing circuits should exhibit equalizing characteristics matched to standard transport speed as well as to long playing transport speed.

From the foregoing, it is appreciated that the frequency characteristics of the reproduced signals are influenced by a combination of the following: Whether the signals are recorded as standard or high quality signals, as discussed above, whether head 12A or 12B is used to reproduce the signals, as also discussed above, whether MP or ME tape is used and whether the tape is transported at a standard or long-playing speed. Since four individual conditions influence the frequency characteristics of the reproduced signals, accurate equalization can best be attained by using $2^4$ equalizer circuits, each circuit exhibiting equalizing characteristics matched to a respective combination of these four factors. In one embodiment of the present invention, the equalizing operation is achieved by constructing each equalizer circuit 42–45 as four separate equalizers, each having the configuration illustrated in FIG. 4. Thus, a total of sixteen separate equalizer circuits are provided, only one of which is connected in the signal reproduction path at any given time.

Figure 4:
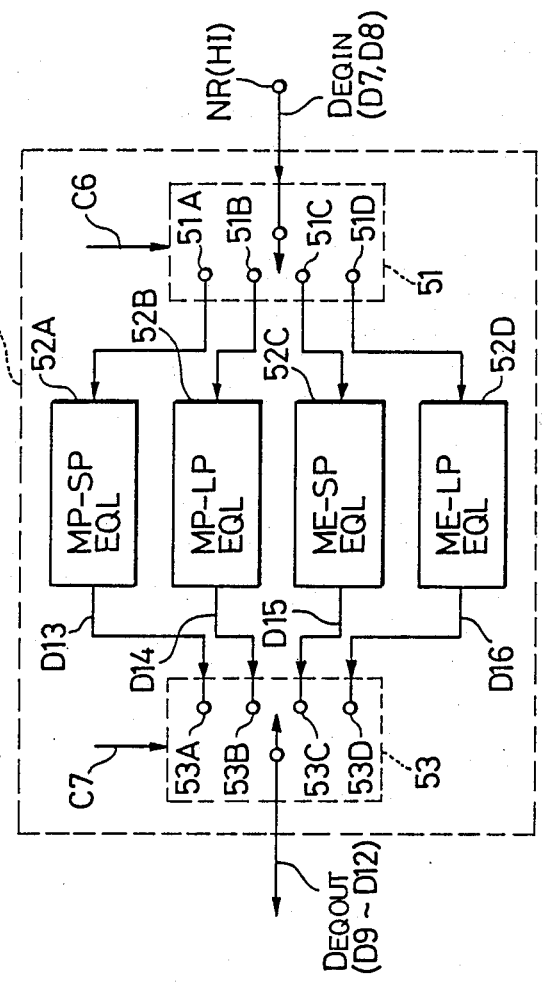
FIG. 4 is a block diagram of one embodiment of the equalizer circuit shown in FIG. 3.

As shown in FIG. 4, equalizer circuit 42, as an example, is comprised of equalizers 52A, 52B, 52C and 52D, the inputs of these equalizers being coupled to an equalizer selector 51, shown as a switching circuit, and the outputs of these equalizers being coupled to another equalizer selector 53, also shown as a switching circuit. Equalizer selectors 51 and 53 are controlled by control signals C6 and C7 and, as will be described, the equalizer selectors are synchronized for concurrent selection.

Equalizers 52A–52D included in equalizer circuit 42 all exhibit equalizing characteristics matched to the frequency characteristics of the standard quality playback signals and also to the playback characteristics of head 12a. Likewise, all of equalizers 52A–52D included in equalizer circuit 43 exhibit equalizing characteristics matched to the standard quality playback signal and also to the playback characteristics of head 12B. In a similar manner, all of equalizers 52A–52D included in equalizer circuit 44 exhibit equalizing characteristics matched to the frequency characteristics of the high quality playback signals and also to the playback characteristics of head 12B. Finally, all of equalizers 52A–52D included in equalizer circuit 45 exhibit equalizing characteristics matched to the high quality playback signals and also to the playback characteristics of head 12B. In addition, equalizer 52A exhibits additional equalizing characteristics matched to MP tape transported at standard playing speed. The equalizing characteristics of equalizer 52B are additionally matched to the characteristics of MP tape transported at long playing speed. Similarly, the equalizing characteristics of equalizer 52C are matched to the characteristics of ME tape transported at standard speed; and the equalizing characteristics of equalizer 52D are additionally matched to the characteristics of ME tape transported at long playing speed.

For the construction wherein equalizers 52A–52D are included in equalizer circuit 42, equalizer selector 51 includes an input coupled to terminal NR of switch 41A included in equalizer selector 41. Switch 53 is provided with an output connected to terminal A of switch 55A of head selector 55.

For the construction wherein equalizers 52A–52D are included in equalizer circuit 43, the input of equalizer selector switch 51 is coupled to terminal NR of switch 41B included in equalizer selector 41; and the output of switch 53 is coupled to terminal B of switch 55A of head selector 55. Likewise, for the construction of equalizers 52A–52D as equalizer circuit 44, the input of equalizer selector 51 is coupled to terminal HI of switch 41A included in equalizer selector 41; and the output of switch 53 is coupled to terminal A of switch 55B of head selector 55. Finally, for the construction of equalizers 52A–52D as equalizer circuit 45, the input of equalizer switch 41 is coupled to terminal HI of switch 41B of equalizer selector 41; and the output of switch 53 is coupled to terminal B of switch 55B of head selector 55.

A summary of the manner in which equalizer selector 41, equalizer selectors 51 and 53 and head selector 55 operate to connect the appropriate equalizer 52A–52D included in equalizer circuits 42–45 into the playback signal path is represented by the table shown in FIG. 5. This table indicates the particular equalizer that is connected as a function of whether the reproduced signal had been recorded with standard or high quality, that is, whether it had been recorded with lower or higher recording densities, whether the signals were reproduced by head 12A or 12B, whether the magnetic tape is type MP or type ME and whether the tape is transported at standard or long playing speeds. It is believed that this table is self explanatory; and there is no need for further, duplicative explanation of the manner in which switches 41, 51, 53 and 55 operate to select an equalizer for connection between playback amplifier 26A, 26B and data detector 56, 57.

Thus, even though the quality with which the digital audio signals are recorded may be selected to be of different types, and even though the type of magnetic tape and tape speed also may differ from one record/reproduce operation to another, the same record/playback unit 13B and data processing unit 13A nevertheless may be used without a noticeable change in the bit error rate.

Proper selection of the particular equalizer which should be used during a reproduce operation is determined by control signals C4–C7, all of which are included in the control signal $S_{CONT}$ shown in FIG. 1. A determination of whether standard or high quality playback signals are reproduced may be made on the basis of an initial detection of bit error. Discrimination between MP and ME tape may be based upon suitable indicia provided on the tape itself or the cassette in which the tape is housed. Discrimination between standard and long playing speeds may be a function of the automatic track follower (ATF) operation which, as is known, results in different track configurations as a function of tape speed.

Figure 6:
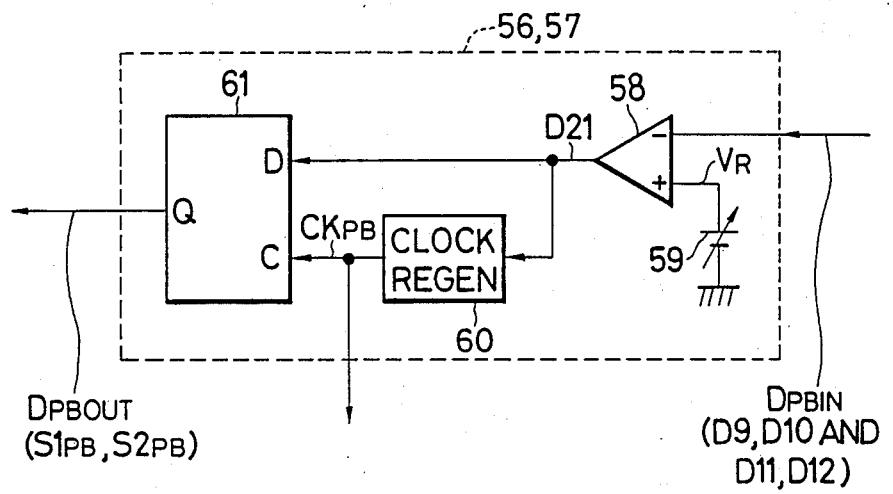

One embodiment of a data detector that may be used as standard quality data detector 56 or as high quality data detector 57 is illustrated in FIG. 6. As shown, the data detector is comprised of a comparator 58, a clock regenerator 60 and a synchronizer 61. Equalized digital audio signals supplied by switch 55A (or switch 55B) of head selector 55 is shown in FIG. 6 as input playback data $D_{PBIN}$. It is seen that this data stream $D_{PBIN}$ is comprised of data signals D9 and D10 during a standard quality playback operation, or is comprised of signals D11 and D12 during a high quality playback operation. In any event, input data $D_{PBIN}$ is compared to a reference voltage $V_R$ generated by a reference generator 59. If the input digital data $D_{PBIN}$ exceeds reference voltage $V_R$, a "1" is produced by comparator 58. Conversely, if the voltage level of input data $D_{PBIN}$ is less than reference voltage $V_R$, comparator 58 produces a "0". The reference voltage $V_R$ may be selected equal to the zero crossing level of the reproduced, modulated signals.

The "1"s and "0"s produced by comparator 58 are supplied as discriminated digital signals D21 to clock regenerator 60 and to synchronizer 61. The clock regenerator includes a phase locked loop and is adapted to regenerate the clock component included in discriminated digital signals D21. One example of a suitable clock regenerator is described in copending application Serial No. 7/248,185.

The regenerated clock signal $CK_{PB}$ produced by clock regenerator 60 is used to synchronize the discriminated digital signals D21 produced by comparator 58. In one embodiment, synchronizer 61 comprises a D-type flip-flop circuit whose data input is coupled to receive the discriminated digital signals D21 and whose clock input is coupled to receive the regenerated clock signal $CK_{PB}$ produced by clock regenerator 60. The Q output of synchronizer 61 thus is a synchronized digital signal whose level is determined by discriminated digital signals D21 and whose timing is determined by regenerated clock signal $CK_{PB}$. The synchronized digital data $D_{PBOUT}$ is supplied to further circuitry as either the standard quality digital audio signal $S1_{PB}$ or the high quality digital audio signals $S2_{PB}$. Although not shown, the regenerated clock signal $CK_{PB}$ is used to demodulate the standard more high quality digital audio signals $D_{PBOUT}$. The regenerated clock signal $CK_{PB}$ also may be supplied to the system controller (not shown) and used as the system clock.

The digital audio signal $S_{AD}$ recorded as a standard quality signal, such as by biphase-mark modulation with frequencies $f_1 = 2.9$ MHz and $f_2 = 5.8$ MHz has the frequency characteristics illustrated in FIG. 13 by the curve $S_{ADNR}$. When used in 8 mm format video recording, the peak level of the standard quality PCM audio signal $S_{ADNR}$ substantially coincides with the center frequency of the frequency modulated luminance component S1V. It is seen that the Nyquist frequency of the standard quality PCM audio signal $S_{ADNR}$ is equal to $2f_2 = 11.6$ MHz. The frequency spectrum of the high quality PCM audio signal also is illustrated in FIG. 13 as curve $S_{ADHI}$. When 8-bit NRZI modulation is used, it is seen that the peak level of the high quality PCM audio signal $S_{ADHI}$ occurs at a frequency less than that of the peak level of the standard quality PCM audio signal $S_{ADNR}$. Also, the Nyquist frequency of the high quality PCM audio signal $S_{ADHI}$ is approximately 14.8 MHz. Based upon the relatively high frequency components included in both the standard and high quality PCM audio signals, it is recognized that azimuth loss permits both signals to be recorded and played back with minimal cross-talk pick-up even in the absence of guard bands between adjacent tracks.

It is recognized that the equalizing characteristics of equalizer circuits 42 and 43 match the frequency characteristics of the standard quality PCM audio signal $S_{ADNR}$ shown in FIG. 13; and the equalizing characteristics of equalizer circuits 44 and 45 match the frequency characteristics of the high quality PCM audio signal $S_{ADHI}$, also shown in FIG. 13.

FIGS. 7 and 8 are sectional views of, for example, MP and ME magnetic tapes, respectively. FIG. 7 represents a magnetic layer 65A coated on a suitable base or substrate 65B, resulting in magnetic tape 65. The recording characteristics of MP tape 65 exhibit a peak level in a region near biphase-mark modulation frequency $f_1$ (i.e. in a region near 2.9 MHz). Curve MP, shown in FIG. 9, represents the amplitude vs. frequency recording characteristics of MP tape.

ME tape 66 (FIG. 8) is formed by evaporating or sputtering a magnetic layer 66A on base 66B. Since magnetic layer 66A is thinner than magnetic layer 65A (FIG. 7), it is possible for a low frequency signal component to "punch through" the magnetic layer during recording. Accordingly, the frequency characteristic of ME exhibits a peak level in a region near biphase-mark modulation frequency $f_2$ (that is, in a region near 5.8 MHz). The amplitude vs. frequency recording characteristics of ME tape also are illustrated in FIG. 9.

Since magnetic layer 65A of MP tape 65 is formed by coating, the axis of easy magnetization generally is not formed on the surface of the magnetic tape. However, by using vapor deposition to form layer 66A or ME tape, the axis of easy magnetization tends to be formed on the surface of the tape. Consequently, these different types of tape exhibit different frequency characteristics which are addressed by the present invention.

FIG. 10 is a representative diagram of track patterns traced on magnetic tape 1 for different tape speeds. Those tracks shown in solid lines are the tracks traced by heads 12A and 12B during a standard tape transport speed. However, when the transport speed is reduced so as to increase the recording/playing time, the resultant tracks which are traced across the tape are illustrated by the broken lines in FIG. 10. It is seen that the scanning direction of the heads with respect to the axis of easy magnetization on tape 1 is changed when the tape transport speed is changed (e.g. reduced). This, in turn, influences the frequency characteristics of the signals played back from the tape. Here too, the present invention addresses and equalizes this change in the frequency characteristics due to a selection of standard or long playing transport speed.

While the present invention has been particularly shown and described with reference to a preferred embodiment, it will be readily appreciated by those of ordinary skill in the art that various changes and modifications are contemplated. For example, additional equalizers similar to equalizers 52A-52D may be used to match the frequency characteristics of signals that may be reproduced when the magnetic medium is transported at higher than standard speed. For example, two additional equalizers may be provided, one having equalizing characteristics matched to MP tape transported at the higher speed and the other having equalizing characteristics matched to ME tape transported at the higher speed. Also, although only biphase-mark and 8-10 modulation have been described, the present invention obviously is applicable to recording/reproducing techniques which use other types of modulation. That is, modulation/recording techniques in which digital data having higher than standard recording densities may be used with the present invention. Such higher recording densities can be achieved by modulation and encoding techniques other than simply 8-10 modulation. Still further, although the magnetic medium described herein preferably is in the form of magnetic tape, it is understood that other magnetic media may be used for the recording and reproduction of digital signals, such as magnetic disks, magnetic sheets and the like. Also, although the present invention has been described in the environment of 8 mm format video tape recorders, it is clear that this invention need not be limited solely to that environment. Other recording/reproducing devices are contemplated, including other formats of video recorders, digital audio tape recorders and other digital information recorders not necessarily limited to audio data. Rather, the invention described herein finds application in information recorders which are capable of recording data with different recording densities. The purpose of this invention is to provide data reproducing apparatus which is compatible with such different recording densities.

Therefore, it is intended that the appended claims be interpreted including the foregoing as well as other equivalents.

What is claimed is:

1. Data reproducing apparatus for reproducing data that is recorded on a record medium with a selected one of at least two different recording densities, whereby first or second playback data having first or second frequency characteristics, respectively, is picked up, and wherein said record medium is a magnetic medium having a selected one of plural different recording characteristics, comprising:

first equalizer means including first and second equalizer circuits each having equalizing characteristics matched to the first frequency characteristics of the first playback data with said first equalizer circuit having equalizing characteristics additionally matched to one of the recording characteristics of the magnetic medium and said second equalizer circuit having equalizing characteristics additionally matched to another of the recording characteristics of the magnetic medium;
second equalizer means including third and fourth equalizer circuits each having equalizing characteristics matched to the second frequency characteristics of the second playback data with said third equalizer circuit having equalizing characteristics additionally matched to said one recording characteristic of the magnetic and said fourth equalizer circuit having equalizing characteristics additionally matched to said other recording characteristics of the magnetic medium; and
switching means for switching said first or second equalizer means in circuit to process the picked up data as a function of whether said first or second playback data is picked up, thereby reducing a bit error rate of data derived from said first and second equalizer means, respectively.

2. Data reproducing apparatus for reproducing data that is recorded on a record medium wit a selected one of at least two different recording densities, whereby first or second playback data having first or second frequency characteristics, respectively, is picked up, and wherein said record medium is a medium transported at a selected one of plural different transport speeds during a playback operation, comprising:
first equalizer means including first and second equalizer circuits each having equalizing characteristics matched to the first frequency characteristics of the first playback data with said first equalizer circuit having equalizing characteristics additionally matched to one of the transport speeds and said second equalizer circuit having equalizing characteristics additionally matched to another of the transport speeds;
second equalizer means including third and fourth equalizer circuits each having equalizing characteristics matched to the second frequency characteristics of the second playback data with said third equalizer circuit having equalizing characteristics additionally matched to said one transport speed and said fourth equalizer circuit having equalizing characteristics additionally matched to said other transport speed; and
switching means for switching said first or second equalizer means in circuit to process the picked up data as a function of whether said first or second playback data is picked up, thereby reducing a bit error rate of data derived from said first and second equalizer means, respectively.

3. Data reproducing apparatus for reproducing data that is recorded on a record medium with a selected one of at least two different recording densities, whereby first or second playback data having first or second frequency characteristics, respectively, is picked up, and wherein the data is reproduced from adjacent oblique tracks by at least first and second rotary transducers having different playback characteristics and which scan alternate ones of said tracks, comprising:
first equalizer means including at least first and second equalizer circuits each having equalizing characteristics matched to the first frequency characteristics of the first playback data with said first equalizer circuit having equalizing characteristics additionally matched to the playback characteristics of one of said transducers and said second equalizer circuit having equalizing characteristics additionally matched to the playback characteristics of the other of said transducers;
second equalizer means including third and fourth equalizer circuits each having equalizing characteristics matched to the second frequency characteristics of the second playback data with said third equalizer circuit having equalizing characteristics additionally matched to the playback characteristics of said one transducer and said fourth equalizer circuit having equalizing characteristics additionally matched to the playback characteristics of said other transducer; and
switching means for switching said first or second equalizer means in circuit to process the picked up data as a function of whether said first or second playback data is picked up, thereby reducing a bit error rate of data derived from said first and second equalized means, respectively.

4. Apparatus for reproducing digital data from plural tracks on a movable magnetic medium, wherein at least two playback heads which may have different playback characteristics pick up digital data that has been recorded with a selected one of plural different recording densities from respective tracks of the magnetic medium which is a selected one of plural different types having different recording characteristics and which is transported at a selected one of plural different transport speeds, said apparatus comprising:
at least two sets of equalizing circuits, each of said sets of equalizing circuits including multiple equalizing circuits having equalizing characteristics matched to the playback characteristics of a respective one of said playback heads and each of said multiple equalizing circuits having an equalizing characteristic matched to the combination of a respective one of said plural recording densities, a respective one of said magnetic medium recording characteristics and a respective one of said medium transport speeds such that the equalizing circuits included in each of said sets thereof exhibit different equalizing characteristics matched to substantially all combinations of said plural recording densities, magnetic medium recording characteristics and magnetic medium transport speeds;
switch means for selecting one of said equalizing circuits in each of said sets thereof in accordance with the recording density of the picked up digital data, the type of magnetic medium from which the digital data is picked up and the transport speed of the magnetic medium;
means for supplying the digital data respectively picked up by said at least two playback heads to the selected equalizing circuits included in the respective sets thereof having equalizing characteristics matched to said playback characteristics of said at least two playback heads, respectively; and
means for combining the outputs from said first and second sets of equalizing circuits to form a digital data stream.

5. The data reproducing apparatus of claim 4, wherein data recorded with one of said recording densities has a frequency spectrum with a central frequency component that is higher than the central frequency component that is higher than the central frequency component of the frequency spectrum data recorded with another of said recording densities.

6. The data reproducing apparatus of claim 5, wherein the recorded data is digital data in which "1"s and "0"s are recorded with said one recording density by recording different frequencies to represent said "1"s and "0"s, respectively.

7. The data reproducing apparatus of claim 5; wherein the recorded data is digital data in which multi-bit data works are recorded with said other recording density by recording $2^N$ blocks of M-bit words from a possible $2^M$ blocks, wherein N is the number of bits in a sub-block, each multi-bit data word is divided into plural N-bit sub-blocks, each N-bit sub-block is converted into M-bits words, and $M > N$.

8. The data reproducing apparatus of claim 7; wherein $N=8$ and $M=10$.

* * * * *